July 5, 1960
B. W. FOSTER
2,943,610
FREE PISTON COMPRESSED GAS GENERATOR
Filed June 30, 1958
4 Sheets-Sheet 2
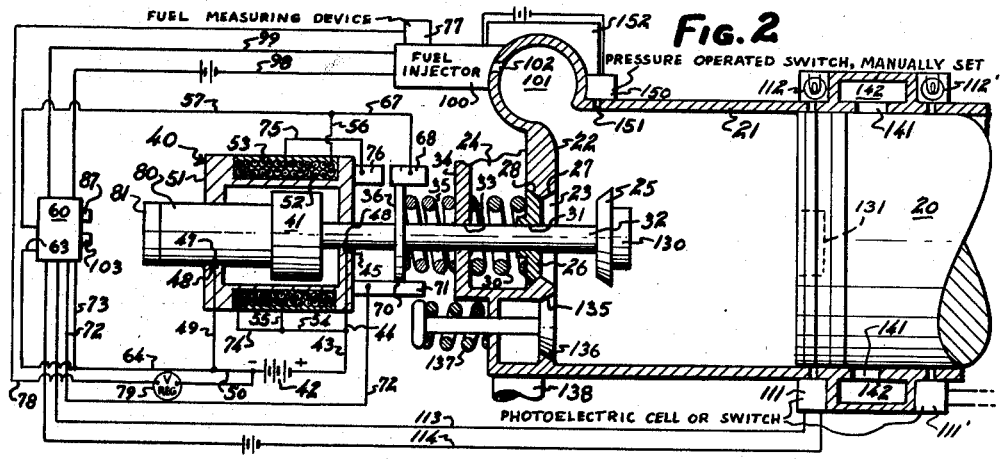
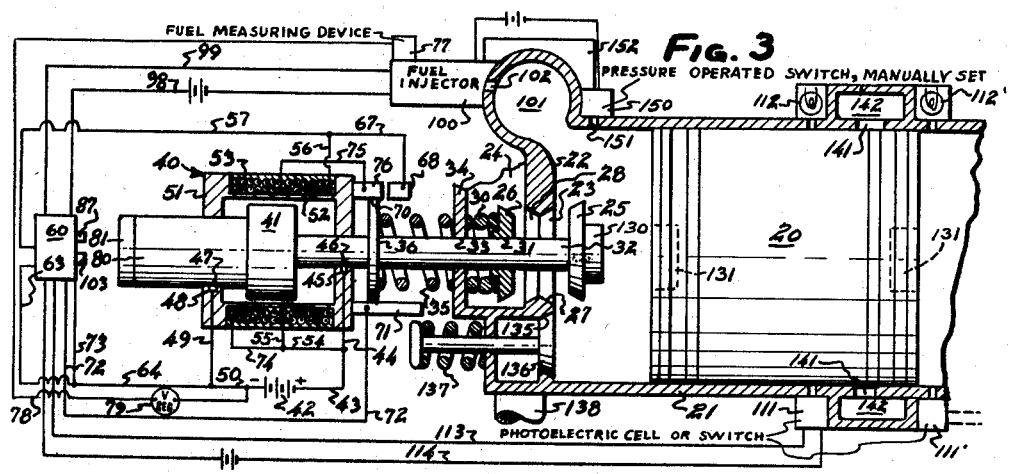
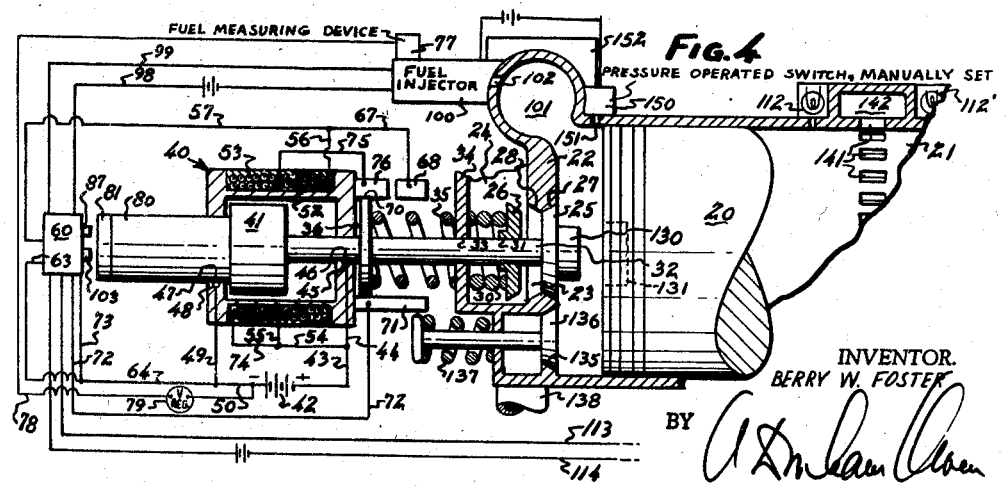
INVENTOR.
BERRY W. FOSTER
BY
ATTORNEY July 5, 1960  B. W. FOSTER  2,943,610
FREE PISTON COMPRESSED GAS GENERATOR
Filed June 30, 1958  4 Sheets-Sheet 3
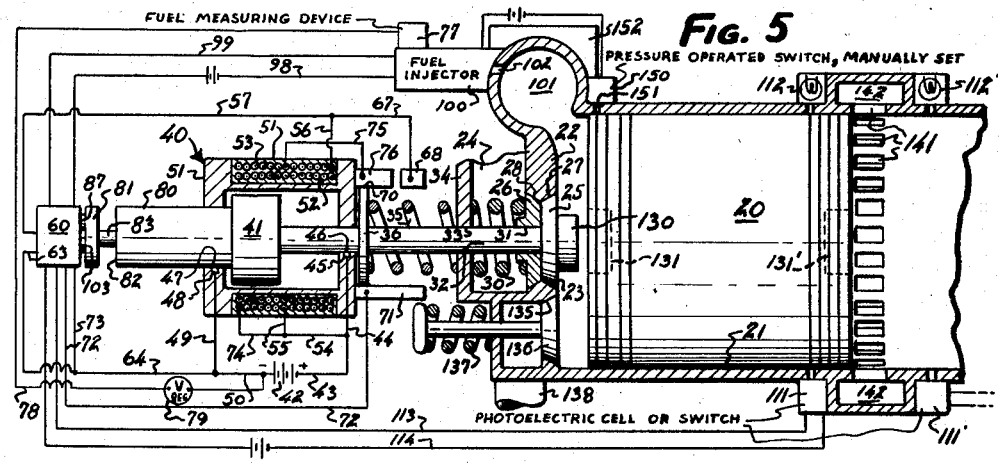
INVENTOR.
BERRY W. FOSTER
BY
ATTORNEY July 5, 1960  B. W. FOSTER  2,943,610
FREE PISTON COMPRESSED GAS GENERATOR
Filed June 30, 1958  4 Sheets-Sheet 4

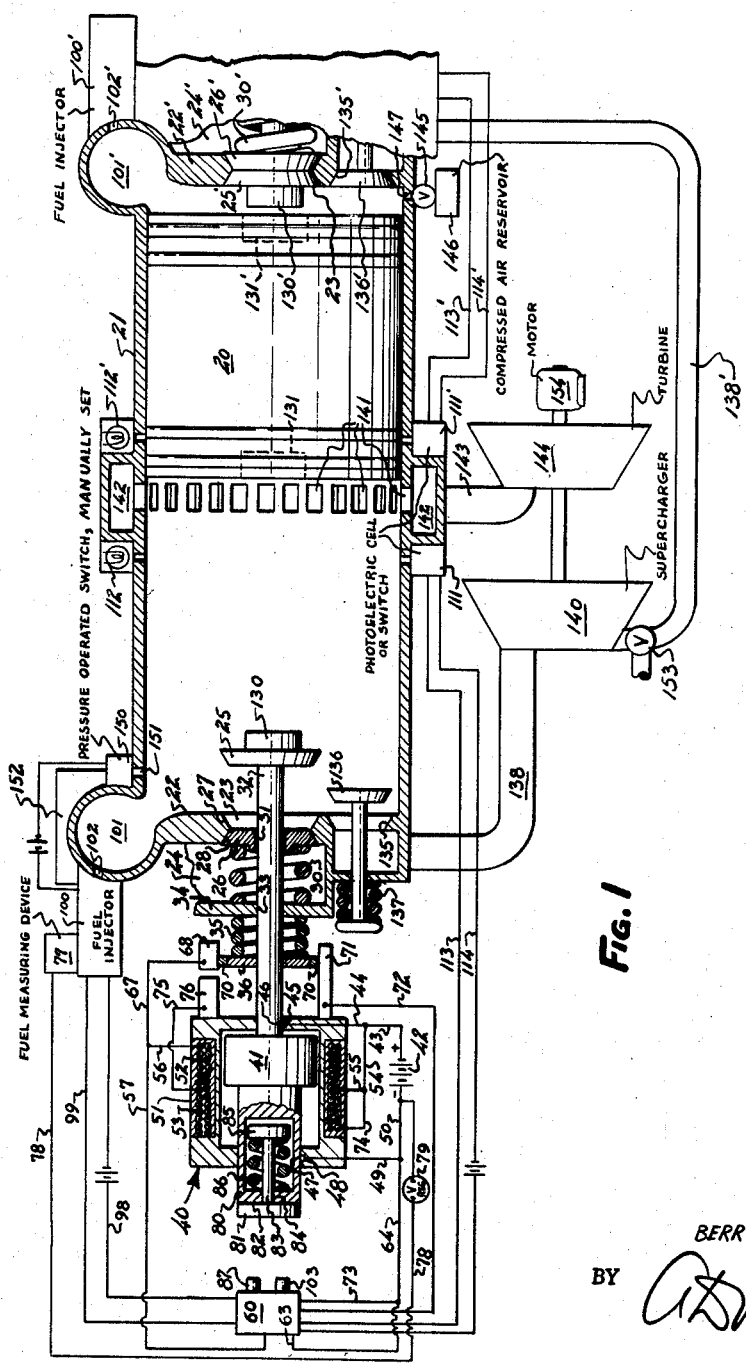

INVENTOR.
BERRY W. FOSTER
BY
ATTORNEY

United States Patent Office 2,943,610
Patented July 5, 1960

2,943,610

FREE PISTON COMPRESSED GAS GENERATOR

Berry W. Foster, 1147 10th St., Santa Monica, Calif.

Filed June 30, 1958, Ser. No. 745,643

14 Claims. (Cl. 123—46)

This invention relates to an improved free piston compressed gas generator of the general type shown in my Patent No. 2,807,136 and my co-pending application Serial No. 705,469, filed December 24, 1957. The engines shown in this invention are well suited to aircraft, where high specific power per unit weight is desirable.

A feature of the type of engine concerned in this invention is its division of the compressed gas into two isolated portions. The internal power that runs the compressor is obtained by burning fuel in one of these two portions. The other portion represents the output of the compressor. The compressed output gas may be stored or expanded or may be fueled and exploded, as desired. If used as part of a jet engine or gas turbine, the fuel is separately burned in both of the isolated portions of the compressed gas.

Suppose that the volume of the gas that is isolated outside the compressor cylinder is $a$ and that $b$ is the volume of the compressed gas isolated in the cylinder chamber at the moment of isolation and the addition of energy. Then, if the unit masses of the compressed gas in $a$ and $b$ are $m_1$ and $m_2$, respectively, the total mass M of the compressed gas will be $M = am_1 + bm_2$. The energy in the mass $bm_2$ should be as near as possible to the exact amount which, when energy is added, will compress a second mass, M', to the same compression ratio by driving the piston back across the cylinder at the opposite end of the cylinder or by compressing a mass of recoil air at the opposite end of the piston which will give its energy back to the engine piston. The output energy $am_1$ is available as external power, and the operating efficiency of the engine is at its peak when $am_1$ is large in proportion to $bm_2$.

The invention may be used to supply a storage tank, reservoir, or compressor output chamber with compressed gas. At each stroke (or each alternate stroke) a portion of the compressed gas is isolated, energy is added, and the resultant expansion of this portion of the gas drives the compressor piston, while the rest of the compressed gas is conducted into the storage tank, reservoir, or output chamber. The energy in the gas that drives the piston is sufficient to move it toward the other end of the cylinder and compress a like amount there or to store energy which will be returned to the piston.

My novel compressor unit may employ a free piston instead of a piston having a connecting rod and crankshaft, but the invention differs from other free-piston engines in several particulars, including the following:

(1) The compressor-power air is separated from the external-power air and conducted to the output chamber before heat is added, so that only a fraction of the total amount compressed is expanded in the compressor-engine cylinder, which may be one and the same cylinder.

(2) The external-power air performs no work on the piston.

(3) The compressor-power air does all the work on the piston.

(4) The piston itself does no external work, although the heated gases, which are expanded in the compressor engine, may do some external work if that is desirable. Usually, however, that is kept to a minimum.

(5) Like the invention disclosed in Serial No. 705,-469, filed December 24, 1957, the separating port is closed at the beginning of the compression stroke and remains closed until the gas in the engine cylinder is compressed to a prescribed pressure or until the piston reaches a prescribed position in the engine cylinder. Then the separating port is opened and part of the air is forced out of the cylinder by a substantially constant pressure flow process. At a predetermined piston position, the separating port is again closed. Unlike the device of Serial No. 705,469, a different valve is used to close the port in this operation. This valve is closed by a solenoid mechanism, while the trapped remainder of air in the engine cylinder is heated to power the engine. Operation of this cycle by a unique mechanism constitutes a principal distinguishing feature of the present invention.

(6) There is no blow-down pressure loss at the exhaust port of this free piston engine.

General operation of the invention

A supercharger scavenges a free-piston engine cylinder through intake and exhaust ports and leaves a charge of supercharged air in the engine cylinder. Some force (whether recoil air, an explosion on the opposite side of the piston, or flywheel momentum) forces the engine piston toward the other end of its stroke. The intake and exhaust ports are closed by the movement of the engine piston as it starts this compression stroke.

The engine piston compresses the fresh air trapped in the engine cylinder up to a prescribed pressure; then a separating valve is pneumatically opened, and part of the high-pressure air in the engine cylinder is forced through a separating port into a high-pressure air reservoir by the movement of the piston, which produces a constant-pressure flow process in the engine cylinder. When its engine piston reaches a prescribed position near the end of its compression stroke, it actuates a solenoid that forces a second separating valve to close the same separating port.

Then fuel is injected and exploded in the portion of high-pressure air that remains trapped in the engine cylinder. The combustion may be by a constant pressure or by a constant volume process. In a single-acting engine, this heated gas in the engine cylinder expands and forces the piston to compress some recoil air at the opposite end of its piston for energy storage, or a mechanical linkage of the piston to a fly-wheel, etc., may store energy. This stored energy is returned to the engine piston, causing it to repeat its compression stroke. In a double-acting engine, this heated gas in the engine cylinder expands and moves the piston to compress air on the opposite side of the piston, and the same cycle is repeated alternately on both sides of the piston.

The compressed air that is forced into the high-pressure reservoir or compressor output chamber is used as desired. For example, the compressed air may be fueled and exploded in a jet engine or in a gas turbine. Many other uses for compressed air are well known.

Other objects and advantages of the invention will be better understood from the following description of some preferred embodiments as illustrated in the accompanying drawings. However, it is to be understood that the drawings and descriptions are illustrative only and are not definitive of the invention, the scope of which is stated in the appended claims.

In the drawings:

Fig. 1 is a fragmentary view in side elevation and mostly in section of a double-acting free-piston compressed gas generator embodying the principles of the invention, with the right-hand side broken off in order to conserve space, it being substantially identical to the left-hand side. Also, some parts external to the cylinder are shown diagrammatically. The piston is just beginning its compression stroke toward the left-hand side of the cylinder.

Fig. 2 is a view similar to the left-hand side of Fig. 1, with the engine piston moved somewhat to the left to close exhaust and intake ports, trapping a fresh charge of air in the engine cylinder.

Fig. 3 is a view similar to Fig. 2, with the engine piston moved further to the left, increasing the air pressure in the engine cylinder to the point where a check valve has opened to let compressed air flow out through a port into a reservoir for high-pressure gases.

Fig. 4 is a similar view with the piston moved still further to the left and a solenoid-operated separating valve closed, separating the compressed air into two parts, one in the reservoir, the other in the engine cylinder.

Fig. 5 is a similar view showing the piston having passed the end of its leftward stroke and beginning to move to the right.

Fig. 6 is a similar view showing the engine piston near the end of its expansion stroke to the right.

Fig. 10 is a view similar to Fig. 9 showing the switch in two different positions, one in solid lines and one in broken lines.

*General valve structure*

Figure 7:
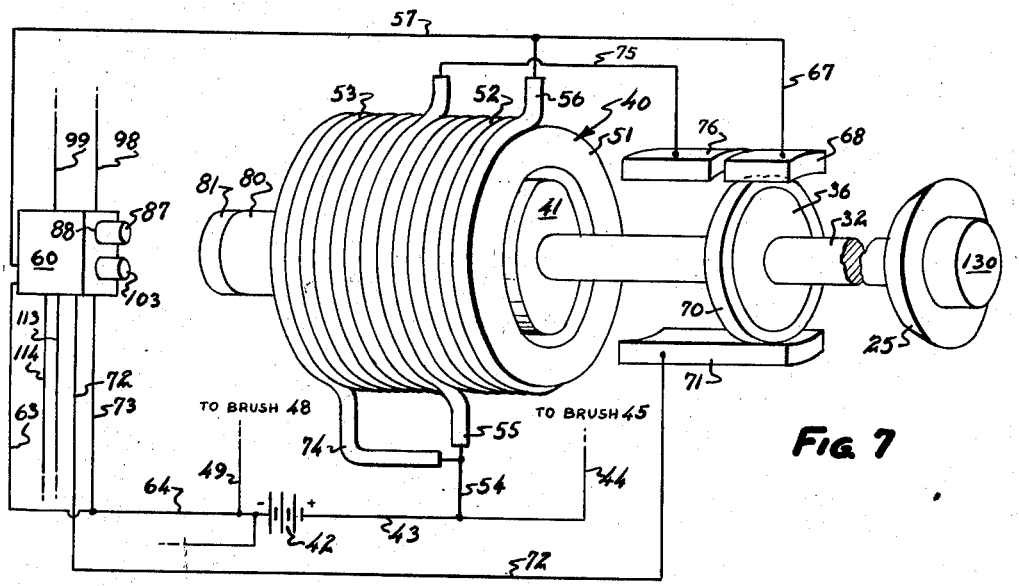
Fig. 7 is a view on an enlarged scale, partly in perspective and partly diagrammatic of a portion of the device of Fig. 1, comprising a solenoid and associated parts.

Figs. 1 to 6 show a double-acting, free-piston, compressed-gas generator incorporating a spring-closed and pneumatically opened check valve and a coaxial solenoid-closed and spring-closed, solenoid-opened valve that both act to close the same separating port, from opposite sides.

A free piston 20 reciprocates in an engine cylinder 21 between an engine head 22 at the left end and an identical engine head 22' at the right end. Only the parts in and adjacent the left end head 22 will be described, for it should be understood that these parts are duplicated in the head 22', where they are indicated by primed numbers. (Of course, a single-acting engine with recoil or fly-wheel operation may be used instead, the illustrated engine serving as an example only, though it is itself often to be preferred over other structures.)

In the head 22, a separating port 23 leads from the engine cylinder 21 to a high pressure reservoir or compressor output chamber 24 when both of two coaxial separating valves 25 and 26 are open. The valve 25 is solenoid-operated and moves from the inside of the cylinder 21 toward and away from a seat 27 in the port 23. The valve 26 is a pressure check valve moving from outside the cylinder 21 toward and away from a seat 28 in the port 23. A spring 30 holds the valve 26 closed (as in Figs. 1 and 2) until the pressure of the gas being compressed in the cylinder 21 is sufficient to overcome the spring 30 and open the valve 26 against the high-pressure air in the reservoir 24. The valve 26 has a central opening 31 through which passes, with close clearance, a stem 32 for the valve 25. The stem 32 also passes through an opening 33 in a wall 34 of the chamber 24, suitable means being provided to prevent leakage along the stem 32. A spring 35 is compressed between the wall 34 and a collar 36 on the stem 32 and urges the valve 25 closed whenever a solenoid 40 is de-energized. When the valve 25 is closed and the solenoid 40 is energized, it acts on the valve stem 32 to open the valve 25.

*The solenoid 40*

The solenoid 40 includes a permanent magnet or electromagnet 41 rigidly fastened to the valve stem 32. If it is an electromagnet (as shown in the drawings), it may be energized from a battery or other E.M.F. 42. From the positive side of the E.M.F. 42 lines 43 and 44 lead to a brush 45 which contacts a conductor 46 on the stem 32 and leads to one side of the electromagnet 41. The other side of the electromagnet 41 leads back to the negative side of the E.M.F. 42 through conductor 47 on the stem 32, stationary brush 48, and lines 49 and 50.

The solenoid 40 also includes a stationary coil member 51, actually comprising two separate coils 52 and 53, for an important reason that will be explained later. The coil 52 is connected to the positive side of the E.M.F. 42 by lines 43, 54, and 55. The other side of the coil 52 is connected by leads 56 and 57 to a switch assembly 60, to be described in detail later. When contact points 61 and 62 of the switch 60 are open and the contact points 65 and 66 of the switch 60 are also open, the circuit to the coil 52 is open, and the solenoid 40 is de-energized. When contact points 61 and 62 of the switch 60 are closed, the lead 57 is electrically connected to the negative side of the E.M.F. 42 by leads 63, 64, and 50. Also, when contact points 65 and 66 of the switch 60 are closed, there is a circuit from lead 56 through lead 67, brush 68, ring 70 (mounted on the collar 36), brush 71, lead 72, contact 65, contact 66, and leads 73, 64, and 50 to the negative side of the E.M.F. 42.

The coil 53 is connected to the positive side of the E.M.F. 42 by leads 43, 54, and 74. The other side of the coil 53 is connected by lead 75 to a brush 76. When the stem 32 is in the position where the ring 70 contacts the brush 76, the circuit to the coil 53 is completed by lead 72, points 65 and 66 (if closed) and leads 73, 64, and 50.

An important feature of this invention is that the solenoid-operated valve 25 is closed in a minimum time by switching from the first solenoid coil 52 nearer the port 22 to the second coil 53 further from the port 22, while the valve 25 is moving to the left (Figs. 1–6) during its closing operation. By this means, the magnetic force exerted by the solenoid 40 on its magnet 41 can be kept at a large value that helps to accelerate the separating valve 25 rapidly to its closed positon. In the drawings only two coils 52, 53 are shown, but more coils (and consequently more switchings) may be used if desired. The collar 36 being mounted on the stem 32, the slip ring 70 acts as the switching device for the E.M.F. power 42 between the coils 52 and 53.

It is very important that the magnetic accelerating forces acting on the valve 25 be matched with the gas-pressure forces acting on the engine piston 20, for the valve 25 should be timed to close when the prescribed amount of compressed air has been forced out of the engine cylinder 21 by a constant-pressure-flow process. When the frequency of the engine piston 20 is to be kept constant, the E.M.F. 42 can be kept at a value that will give the prescribed closing time for the separating valve 25. Since the piston frequency is a function of the fuel used, a fuel measuring device 77 may be connected by lead 78 to an automatic regulator 79 (Fig. 1)

on the E.M.F. 42, to adjust it so that the valve 25 will close in the right period and at the correct time with respect to the frequency and position of the engine piston 20.

The switch-control mass 81

At the outer end of the valve stem 32, there may be a hollow housing 80 (see Fig. 1). A mass 81 normally seats against an outer end wall 82 of the housing 80, and a stem 83 of the mass 81 extends inside the housing 80 through an opening 84 and has a collar 85. A spring 86 bears against the collar 85 and urges the mass 81 against the wall 82. As a result of this structure, the separating valve 25, its stem 32, the housing 80, and the mass 81 act like a vibrating mass on a spring. The solenoid 40, the spring 35, and the gas pressure on the valve stem 32 force this assembly to accelerate to the left. By the time the valve 25, mass 81 and engine piston 20 reach the position shown in Fig. 4, the valve 25 impacts with the seat 27, and the momentum of the mass 81 then produces an elastic deformation of the spring 86; so the mass 81 moves away from the wall 82 and contacts the switch 60 (Fig. 5), thereby opening the points 65 and 66 (in a manner to be explained and as shown in Fig. 9); this breaks the circuit to the solenoid 40.

The switch 60

Figure 8:
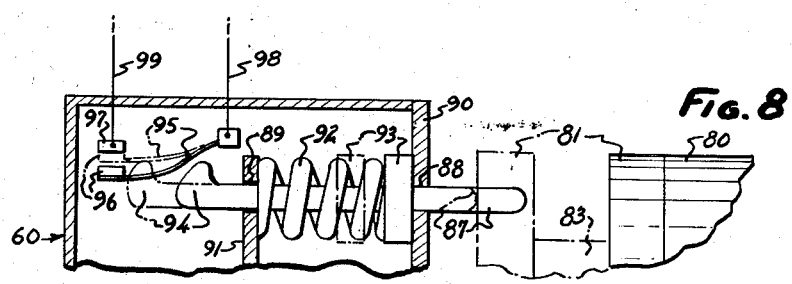
Fig. 8 is a view in elevation and in section on a still further enlarged scale of an actuating switch at the left end of Figs. 1–7, shown in two positions, one in solid lines and the other in broken lines, with the actuator therefor similarly shown. The valve stem is broken in the middle and springs and other intervening parts are omitted.

A detailed description of a preferred type of switch 60 will now be given, although other types of switch systems may be used if desired. Referring to Fig. 8, the fuel-injection circuit will be considered first. A rod 87 slides freely, guided by two aligned guide holes 88 and 89 in respective switch housing members 90 and 91. A spring 92 bears on a collar 93 on the rod 87 to urge it to the right. At the left end of the rod 87 is a cam 94. When the mass 81 contacts the rod 87, it moves it to the left (Fig. 8, broken lines), and the cam 94 then slides along a normally open cantilevered leaf spring 95 and forces a contact point 96 to contact a stationary contact point 97. This closure completes an electrical circuit through leads 98 and 99 and energizes an electrically operated fuel injector 100 (see Fig. 1). Thus fuel is injected into engine combustion chamber 101 through nozzle 102.

Figure 9:
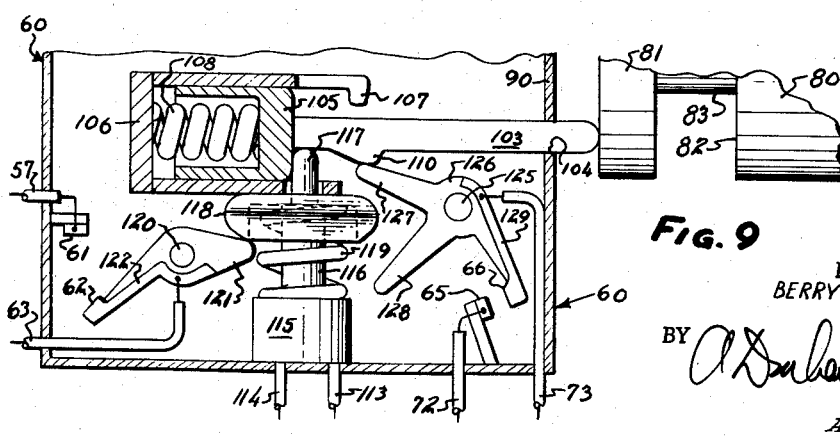
Fig. 9 is a view similar to Fig. 8 of a second actuating switch adjacent to the switch of Fig. 8, but only one position of this switch is shown here.

Referring next to Figs. 9 and 10, a rod 103 is guided by an opening 104 in the partition 90 and slides freely along an axis parallel to that of the valve stem 32. An enlarged cupped end portion 105 slides in a larger cup 106, being retained therein by a keeper 107. A spring 108 normally urges the rod 103 to the right (ref. Fig. 10). The rod 103 preferably has a cam 110.

Slightly to the left of the center of the engine cylinder 21 there may be a photoelectric cell 111 (Fig. 1). Diametrically across the cylinder 21 is a light source 112. The cell 111 is connected by leads 113 and 114 to a solenoid 115 adjacent the rod 103. When the light 112 is uncovered by the engine piston 20, it will shine into the eye of the photocell 111 and energize the solenoid 115, retracting thereinto a core 116. A latch 117 and a cam 118 may be mounted on the core 116. A spring 119 normally urges the core 116 upwardly, with its latch 117 and cam 118, and holds the latch 117 up against the rod 103 when the solenoid 115 is not energized.

When the rod 103 is forced to its right position by the spring 108 (Fig. 10), the latch 117 bears on the cylindrical periphery of the enlarged cup 105. When the rod 103 is forced to the left by the mass 81 (Fig. 9), the spring 119 forces the latch 117 to snap in front of the cup 105 and to hold the cup 105 to the left until the latch 117 is retracted by the solenoid 115.

A counterclockwise torsion spring shaft 120 forces a lever cam 121 to follow the cam 118 and also has a rigid lever arm 122 that carries the contact point 62. Therefore, when the solenoid 115 is de-energized, the breaker points 61 and 62 are open (Fig. 9 and solid lines in Fig. 10). When the solenoid 115 is energized, the cam 118 acts on the lever 122 to force the points 61 and 62 closed (see the broken lines in Fig. 10).

A clockwise torsion spring shaft 125 acts on a spider 126, which has three legs 127, 128, and 129. The breaker point 66 is shown mounted on the spider leg 129 and electrically connected to the lead 73. The point 66 is normally held in contact with the point 65 by the spring 125. When the cam 110 engages the spider leg 127, it rotates the spider 126 counterclockwise and breaks the contact between the points 65 and 66. When the cam 118 engages and moves the spider leg 128, it rotates the spider 126 counterclockwise and breaks the contact between the points 65 and 66.

The safety piston 130

A circular piston 130 (Figs. 1-6) may be located concentrically on the valve 25, the valve 25 and piston 130 moving axially along the center line of the cylinder 21. Located centrally in the piston 20 there may be a circular cavity 131, which has a diameter only slightly larger than piston 130. The piston 130 and cavity 131 act as a safety device. Should the piston 20 be forced to accelerate faster than normal, it forces the circular cavity 131 to slide over the piston 130, thereby providing a pneumatic boost on the valve 25 and insuring its closure before the end of the stroke of the piston 20 and preventing impact between the piston 20 and the head 22. Only in extreme conditions will this safety device come into operation.

Intake and exhaust mechanism

An intake port 135 may be located in the engine head 22. A check valve 136 seats into the port 135 from the inside of the engine cylinder 21, and a spring 137 holds the valve 136 closed until the pressure in engine cylinder 21 is reduced to less than the pressure in a channel 138. Then a supercharger 140 forces a fresh charge of air to flow through the channel 138 and intake port 135 into the engine cylinder 21. When an exhaust port 141 at the center of the engine cylinder 21 is uncovered by the engine piston 20, the burnt gases exhaust through the port 141 into an annular manifold 142. They pass thence into an exhaust pipe 143, whence they are expanded through a gas turbine 144, which preferably powers the compressor 140.

The starting mechanism

The starting mechanism for this free piston engine includes a mechanically or electrically operated valve 145 adjacent the right head end 22' of the engine cylinder 21. This valve 145 connects a compressed-air reservoir 146 to the engine cylinder 21 through a port 147. A pressure-operated switch 150 may be located adjacent the left head 22 of the cylinder 21 and connected thereto by a port 151. The switch 150 is arranged to be cocked, so that it will act only when the engine is being started, and it is connected by a lead 152 to the injector 100. A valve 153 in the pipe 138' may be used during the starting operation, and a motor 154 may run the supercharger 140 during the starting operation.

Starting the free piston engine

At the time the engine is started, the solenoids 40 and 40' are de-energized; so the springs 35 and 35' hold the valves 25 and 25' closed. Pressure is built up in the accumulators 24 and 24' by bleeding compresesd air from the storage tank 146. The pressure switch 150 is cocked to the starting position. The valve 153 is turned so the compressed air from the supercharger 140 will not flow into the line 138', and the line 138' is opened to atmospheric pressure. The check valve 136' on the right end of the engine cylinder 21 is held open.

The motor 154 is started, and it operates the supercharger 140, forcing air to flow through the channel 138 and the port 135 into the engine cylinder 21. This supercharger pressure forces the piston 20 to move to the right. When the piston 20 reaches the Fig. 1 position, the valve 153 is turned so that the channel 138' is connected to the supercharger 140, and so that the atmosphere bypass is closed, and the check valve 136' is thereby closed and held closed.

The valve 145 is now opened to let a surge of high-pressure air flow from the tank 146 through the valve 145 and port 147 into the right end of the cylinder 21. This air pressure forces the piston 20 to accelerate to the left and compress the air in the left end of cylinder 21. This pressure increases until the switch 150 is tripped to actuate the fuel injector 100. Then fuel is sprayed through the nozzle 102 into the combustion chamber 101. At this instant, the valve 145 is closed, and it remains closed until the next time the engine is started. The fuel and air mixture in the combustion chamber 101 burns and flows into the engine cylinder 21 at the head 22; the gases are heated and expand to force the piston 20 to the right, to the Fig. 1 position. All the controls are now set for their normal operating conditions, so that the engine will operate under normal conditions.

*Operation of the free piston engine*

Only the operation of the mechanism on the left end of the engine cylinder will be described; the operation on the right end duplicates these operations, 180° out of phase with the left end. In the Fig. 1 position, the supercharger 140 forces a fresh charge of air to flow through the channel 138 and intake port 135 into the engine cylinder 21 and scavenge the burnt gases out through the exhaust ports 141 into the annular manifold 142 and the exhaust pipe 143. The hot exhaust gases expand through the gas turbine 144, which powers the supercharger 140. In the Fig. 1 position, the light 112 is uncovered; so it energizes the photoelectric switch 111 and thereby energizes the solenoid 115. The energized solenoid 115 forces the cam 118 down to the position illustrated in broken lines in Fig. 10, breaking the contact between the points 65 and 66 and making the contact between the points 61 and 62. At this position, the coil 52 of the solenoid 40 is energized by the E.M.F. 42 through leads 43, 54, and 55, coil 52, leads 56 and 57, points 61 and 62, and leads 63, 64, and 50. Consequently, the solenoid coil 52 acts on the magnet 41 on the valve stem 32 to move the valve stem 32 assembly to its extreme right position, where the recoil action of the spring 35 stops its rightward motion.

An explosion of fuel and air in the right combustion chamber 101' now heats the gases in the right end of the cylinder 21, and these heated gases expand and force the piston 20 to move leftward to the Fig. 2 position. In this position, the piston 20 has moved to cover and close the exhaust sleeve ports 141, and the spring 137 forces the check valve 136 to close the port 135. Also the piston 20 blinds the light 112 from the photoelectric cell 111, de-energizing the solenoid 115. So the spring 119 forces the cam 118 to its Fig. 10 solid-line position, the torsion spring 120 rotates the point 62 away from the point 61 and breaks their contact; while the torsion spring 125 rotates the spider 126 clockwise, so that the point 66 on the spider leg 129 is brought into contact with the point 65. At this position, the coil 52 of the solenoid 40 is energized by the E.M.F. 42 through the circuit leads 43, 54, and 55, coil 52, leads 56 and 67, brush 68, ring 70, brush 71, lead 72, points 65 and 66, and leads 73, 64 and 50 back to the E.M.F. 42. The solenoid coil 52 acts on the magnet 41 to accelerate the valve stem 32 to the left. Also, the spring 35 and the gas pressure in the left end of the cylinder 21 simultaneously act on the valve stem 35 to accelerate its movement to the left.

The piston 20, the valve 25 and the stem 32 are thus all forced to accelerate leftward to their Fig. 3 position. The gas pressure in the left end of engine cylinder 21 has now increased to the point where it overcomes the force of the spring 30 and the gas-pressure force in the accumulator 24, and it forces the check valve 26 to open to the left. The expanding hot gases in the right end of the engine cylinder 21 are still forcing the piston 20 leftward; so the compressed air in the left end of cylinder 21 is forced to flow through the separating port 23 by substantially a constant pressure flow process.

The force of the solenoid 40 on the magnet 41, the force of the spring 35 on the collar 36 of the valve stem 32, and the gas pressure force on the valve stem 32, continue to force the valve 25 and its assembly to accelerate to the left. The E.M.F. 42 to the solenoid 40 is regulated by the regulator 79, which is sensitive to the fuel-flow throttle setting of the meter 77. These forces on the valve 25 are adjusted to such a value that the port 23 is closed by the valve 25 at the instant the prescribed amount of compressed air has been forced out of the left end of the engine cylinder 21.

When the slip ring 70 reaches its Fig. 3 position, it leaves the brush 68 and contacts the brush 76, while still maintaining contact with the brush 71. This action switches the power of solenoid 40 to the coil 53. The coil 53 is then energized by the circuit E.M.F. 42 via leads 43, 54, and 74, coil 53, lead 75, brush 76, ring 70, brush 71, lead 72, points 65 and 66, leads 73, 64, and 50, back to the negative side of the E.M.F. 42. The switching of the solenoid 40 to the leftward coil 53 places a larger force on the magnet 41 to help accelerate the valve 25 closed within a small time interval. Although only two switching changes of coils have been shown in the drawings, more switching changes of coils can be provided if this is desirable.

The separating valve 25 is timed to so close the port 23 that a prescribed amount of compressed air will be left in the engine cylinder 21 and a prescribed amount of the compressed air will have been separated into the accumulator 24.

After the separating valve 25 contacts the seat 27, the momentum energy of the engine piston 20 forces the piston 20 further leftward to compress the trapped air in the left end of cylinder 21 to a higher pressure until the compressed air recoil action stops the leftward motion of engine piston 20.

When the valve 25 comes into contact with its valve seat 27 (Fig. 4), the impact stops the motion of valve 25, stem 32 and magnet 41. However, the momentum of the mass 81 at the left end of stem 32, exerts a force on the spring 86 and the mass 81 continues to move leftward (Fig. 5). This deflected mass 81 contacts the switch-button rods 87 and 103 of the switch 60. When the mass 81 forces the rod 87 to move leftward, the cam 94 acts on the leaf spring 95 and forces the points 96 and 97 into contact. As a result, the fuel-injector circuit, including leads 98 and 99 is completed, and the fuel injector 100 injects fuel through the nozzle 102 into the combustion chamber 101. This fuel explodes and expands into the left end of the cylinder 21, heating the gas there; so that gas expands and does work on the engine piston 20, forcing it to accelerate rightward.

Meanwhile, the mass 81 forces the rod 103 to move leftward against its spring 108, and the latch 117 snaps in front of the cup 105. (See Fig. 9.) Also, the cam 110 acts on the spider leg 127 to rotate the spider 126 clockwise, breaking the contact between the points 65 and 66 and thereby de-energizing the solenoid 40. The solenoid 40 remains de-energized during the explosion and expansion process of the trapped gases in the left end of the engine cylinder 21. During this time, the spring 35 and the gas pressure from the cylinder 21 acts on the valve 25 to hold it closed; also the spring 30 acts on the valve 26 and forces it into its valve seat 28.

As the gases in the left end of the engine cylinder 21 expand and do work on the engine piston 20, the gas pressure in the cylinder 21 will be reduced to a pressure less than that of the supercharger air in the channel 138, and the check valve 136 will then be forced open against its spring 137. Fresh super-charged air then flows in through the port 135 into the cylinder 21, and it flows in the same direction that the gases are expanding.

During the expansion stroke, the solenoid 40 remains de-energized until the engine piston 20 uncovers the light 112 and shines into the photoelectric cell 111 (Fig. 6). Then the circuit to the solenoid 115 is completed; so it is energized. The energized solenoid 115 pulls the latch 117 free from the cup 105, and the spring 108 can then force the rod 103 to move to the right (Fig. 10). Also, the cam 118 acts on the spider leg 128 to rotate the spider 126 counterclockwise against the torsion spring 125, until the contact between the points 65 and 66 is broken (broken lines of Fig. 10).

The cam 118 also acts on the lever cam 121 to rotate the arm 122 and the point 62, so that it will contact the point 61. The contact between points 61 and 62 energizes the coil 52 of solenoid 40 through the circuit of positive terminal for E.M.F. 42, leads 43, 54, and 55, coil 52, leads 56 and 57, points 61 and 62, leads 63, 64, and 50, back to negative terminal of the E.M.F. 42. The solenoid coil 52 now exerts a rightward pull on the magnet 41 and helps to accelerate the valve 25 and its assembly to the right against the force of the spring 35. The recoil action of spring 35 will stop the rightward motion of valve 25 (Fig. 1), and the force of the solenoid coil 52 on magnet 41 has a leftward force action on the magnet 41 when it reaches the Fig. 1 position.

The exhaust port 141 is opened so that the burnt gases can be scavenged and expand through the turbine 144. The supercharger 140 continues to force a fresh charge of air into the left end of engine cylinder 21. The trapped heated gases in the right end of engine cylinder 21 expand and force the piston 20 to the left again. Thus the cycle is completed, and it repeats itself alternately at each end of the cylinder 21, as long as the proper amount of fuel is added and the parts are timed correctly.

The compressed air which is separated from the engine cylinder 21 by a constant pressure flow process during the compression stroke of piston 20 is stored in the accumulators or compressor output chambers 24 and 24' and may be used as desired. This compressed air can be heated by a constant pressure process and then expanded through a gas turbine to give shaft power, etc., or it may be used directly in numerous ways without the addition of heat.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A double acting free piston engine and compressor, including in combination a cylinder having an intake port at each end and an exhaust sleeve port adjacent the center thereof; piston means reciprocable in said cylinder and acting to open and close said exhaust sleeve port; means defining a compressor output chamber adjacent each end of said cylinder and connected therewith by a separating port; separating valve means normallly closing each said separating port; means for moving said separating valve means to open said separating port only after said piston means has moved in the direction toward that said separating port and has compressed the gas in said cylinder to a prescribed value so that a large portion of said gas flows through said separating port into said compressor output chamber; means for closing said separating valve against said separating port as said piston means approaches the limit of its stroke, so that the compressed gas is separated into two portions, one in said output chamber and the other in communication with said piston; and means controlled by said separating valve means for injecting and exploding fuel in said gas in the portion that communicates with said piston so that it drives said piston in the direction away from said port; means for holding said separating valve means closed against the explosion pressures in said engine cylinder; means for supplying air under supercharged pressure to said intake port; and check valve means for normally closing said intake port and holding it closed until the supercharged pressure is greater than the pressure in said cylinder.

2. The device of claim 1 wherein said separating valve means comprises two coaxial valves, one a check valve, which seats, and is normally biased closed, against the outside of said cylinder, said check valve having a circular central hole, and a second valve seating against the inside of said engine cylinder and having a valve stem freely slidable through the hole of said check valve; magnetic means mounted on said valve stem; solenoid means for forcing said magnetic means to move axially; and means controlled by said engine piston and said valve stem for energizing and deenergizing said solenoid.

3. The device of claim 2 wherein said last-named means includes a photoelectric cell on one side of said cylinder and a light on the other side located near the end of the expansion stroke of said piston, said light when uncovered by said piston energizing said photoelectric cell to act on said solenoid means and cause it to open said second valve.

4. The device of claim 2 including electric switching means for shifting said solenoid field to coils in the direction of the motion of said second valve during motion of said second valve toward its closed position, so that the accelerating force on said valve stem magnetic means is kept at a large value to close said second valve at the proper time in a short interval.

5. The device of claim 2 wherein said second valve stem has a mass-and-spring system mounted on its end at the other extreme from its valve, so that when said second valve is stopped by seating impact, the momentum of said mass-spring system produces an elastic deformation; switch means contacted by said mass-spring system during deformation for de-energizing said solenoid means, said solenoid means remaining de-energized until again actuated by said engine piston means, said switch means also energizing said fuel injection means to inject fuel into the air trapped in the engine cylinder in contact with said engine piston.

6. The device of claim 2 wherein a spring biases said second valve toward its closed position, said spring also recoiling in the full open position of said second valve to help close the valve.

7. The device of claim 2 wherein said second valve has, on the side facing said piston, a projecting cylindrical axial portion and said piston has a cylindrical recess of only slightly larger size, to compress air between itself and said cylindrical portion as a safety device to drive said valve closed if it is tardy.

8. The device of claim 2 including means for adjusting the magnetic field and the fuel quantity per injection to close said separating port at the correct time with respect to the engine piston and frequency.

9. The device of claim 2 wherein said check valve is held normally closed by a biasing spring and when said second valve is open and the pressure in said engine cylinder is greater than the pressure of the air in said compressor output chamber, said separating check valve is opened so that air can flow from the engine cylinder into said output chamber.

10. The device of claim 1 wherein the intake check valves are so arranged in said engine that the supercharging air flows in the same direction as the expanding gases in the engine cylinder, and the exhaust gases from said engine flow in the same direction.

11. A free-piston engine and compressor, including in combination a cylinder having an intake port at at least one end and an exhaust sleeve port adjacent the center thereof; piston means reciprocable in said cylinder and acting to open and close said exhaust sleeve port; means defining a compressor output chamber adjacent each intake port and connected to said cylinder by a separating port; separating valve means normally closing said separating port; means for moving said separating valve means to open its said separating port only after said piston means has moved in the direction toward that said separating port and has compressed the gas in said cylinder to a prescribed value so that much of said gas flows into said output chamber; means for closing said separating valve against said separating port as said piston means approaches the limit of its stroke, so that the compressed gas is separated into two portions, one in said output chamber and the other still in communication with said piston; and means controlled by said separating valve means for injecting and exploding fuel in said gas portion that communicates with said piston, to drive said piston in the direction away from said port; means for holding said separating valve means closed against the explosion pressures in said engine cylinder; means for supplying air under supercharged pressure to said intake port; and check valve means for normallly closing said intake port and holding it closed until the supercharged pressure is greater than the pressure in said cylinder.

12. The device of claim 11 wherein said separating valve means comprises two coaxial valves, one a check valve, which seats, and is normally biased closed, against the outside of said cylinder, said check valve having a circular central hole, and a second valve seating against the inside of said engine cylinder and having a valve stem freely slidable through the hole of said check valve; solenoid means for moving said stem axially; and means controlled by said engine piston and said valve stem for energizing and de-energizing said solenoid.

13. The device of claim 12 having means for applying varying pressure against said valve stem from inside said engine cylinder and means for applying constant atmospheric pressure against said valve stem at its opposite end, so that increasing pressure inside said cylinder helps move said second valve to its closed position.

14. The device of claim 11 wherein the piston stroke necessary to open said exhaust valve is balanced against the closure point of said separating valve, the volume of gas trapped in said cylinder by said separating valve being small enough so that upon its explosion and expansion, said piston opens said exhaust port at a time when the pressure of the expanded gas is approximately equal to the supercharged pressure, thereby eliminating blow-down pressure losses at the exhaust port.

References Cited in the file of this patent

UNITED STATES PATENTS

| | | |
|---|---|---|
| 1,741,731 | Nordensson | Dec. 31, 1929 |
| 2,407,790 | LeTourneau | Sept. 17, 1946 |
| 2,503,152 | Ekblom | Apr. 4, 1950 |